C. E. ROGERS.
METHOD OF SEALING METAL CANS.
APPLICATION FILED DEC. 14, 1912.

1,070,736.

Patented Aug. 19, 1913.

WITNESSES,
Selene McDonald
Richard Alepas.

INVENTOR.
CHARLES E. ROGERS
BY Charles E. Wisner
Attorney.

UNITED STATES PATENT OFFICE.

CHARLES E. ROGERS, OF DETROIT, MICHIGAN.

METHOD OF SEALING METAL CANS.

1,070,736.  Specification of Letters Patent.  Patented Aug. 19, 1913.

Continuation of application Serial No. 701,174, filed June 3, 1912. This application filed December 14, 1912. Serial No. 736,749.

*To all whom it may concern:*

Be it known that I, CHARLES E. ROGERS, a citizen of the United States, residing at Detroit, county of Wayne, State of Michigan, have invented a certain new and useful Improvement in Methods of Sealing Metal Cans, and declare the following to be a full, clear, and exact description of the same, such as will enable others skilled in the art to which it pertains to make and use the same, reference being had to the accompanying drawings, which form a part of this specification.

This invention relates to a method of sealing metal cans of that type usually used in the packaging of liquids and food products and the object of this invention is an improved method of sealing the filling aperture in a rapid and economical manner reducing to a minimum the labor involved in inspecting the cans after being sealed and of sealing by hand such as may accidentally be imperfectly sealed.

The usual difficulties involved in sealing cans of the ordinary type for the purpose stated are more fully described in my pending application, Serial No. 701,174, of which this application is a continuation as to all common subject-matter. As fully brought out in said pending application, the can with which the method herein disclosed is adapted to be used is provided with a filling aperture formed by a displacement of the material to project exteriorly of the can whereby it is in such position as to be conveniently acted upon and forced back into the aperture and soldered in place. The superiority of this method over that ordinarily in use is hereinafter more fully described and is divergent or differs from the method disclosed in the pending application in that the displaced material is forced into the opening slightly below the original position occupied thereby in a manner to form a shallow pocket which is subsequently wholly or partially filled with solder and the utility of forming a pocket is to prevent a spreading of the solder over the top of the can and thus avoid a waste thereof inasmuch as with the pocket no more solder is necessary than is actually required to close the aperture whereas if the solder were allowed to spread, as might be the case without the use of a pocket, a larger amount of solder would be required to assure the sealing of the aperture.

Figure 2:
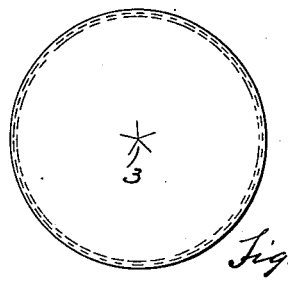
Figure 1:
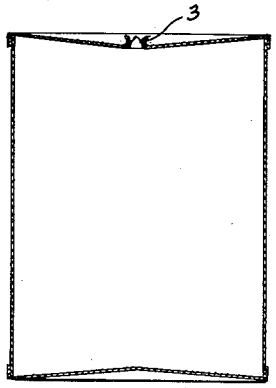
Figure 4:
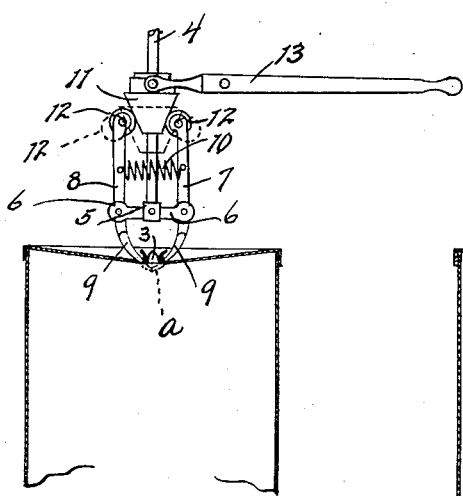
Figure 3:
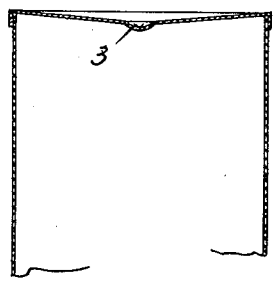

In the accompanying drawings Figure 1, is a vertical section of a can having a filling aperture formed by a displacement of the material to project exteriorly of the can. Fig. 2, is a plan view of a can top illustrating the appearance thereof after the displaced material has been forced back into the aperture. Fig. 3 is a sectional view of the can top showing the shallow pocket for the retention of solder. Fig. 4 is a like view showing somewhat diagrammatically a method and means by which the displaced material may be forced into the aperture to form the shallow pocket.

Similar characters refer to similar parts throughout the drawings and specification.

Prior to being secured to the body the can top is punched in such manner as to leave the displaced material projecting exteriorly of the can when assembled with the body and the opening thus formed may be of various sizes for various purposes, in some instances being less than one-eighth of an inch in diameter and, as is indicated in Fig. 1, the displaced material tends to roll back away from the opening and therefore in no way interferes with the insertion of the filling tube into the opening in the usual manner.

The punch used in displacing the material may be of any desired shape but is preferably of such shape as to cut the material into the form of five converging prongs as indicated at 3, in Fig. 2, in which it may be seen that the opening is completely closed with the exception of barely perceptible slits between the converging prongs when forced into the aperture.

One of many efficient means that may be utilized in forcing the displaced material into place in the aperture is shown somewhat diagrammatically in Fig. 4 in which perpendicularly positioned revoluble shaft 4 is provided, upon the lower end of which is attached the head 5 having arms 6 to which are pivotally connected levers 7 and 8. The lower end of each of the arms 7 and 8 is provided with a steel jaw 9 and the jaws are normally held in open position by a spring 10 connecting the two levers above the pivot points and the jaws are of a form adapted to engage the projecting displaced material. Splined to the shaft 4 and revoluble therewith is a cone 11 engaged by the rollers 12, 12 secured to the ends of the levers 7 and 8. The cone 11 may be reciprocated on the shaft by means of a pivoted lever 13 supported in any convenient manner.

With the parts in the position shown in Fig. 4, if the shaft 4 be made to rapidly revolve in any convenient manner, the prong engaging jaws 9 rotate about the projecting material during which rotation the cone 11 is forced downwardly on the shaft as is indicated by dotted lines, and the jaws 9 are gradually forced together which rolls the displaced material into the opening. If during such rotation and gradual forcing together of the jaws 9, the shaft 4 and attached parts be forced downwardly, the jaws at the time they are completely closed, will occupy a position as indicated by dotted lines at $a$ in Fig. 4 and the displaced material will thereby be depressed or forced below the original position occupied prior to the forming of the aperture and a shallow pocket will thus result and the can end will have substantially the appearance of that indicated in Fig. 3, in which the can is shown as being in condition to receive the sealing medium. The material may also be forced back into substantially its original position by the means shown diagrammatically in the heretofore mentioned pending application and if the material be replaced in such manner it may be passed directly to an automatic soldering iron which is so positioned relative to the can top that in descending thereupon to deposit the solder it will slightly depress the cut portions of the top to form a shallow pocket at that point simultaneously with the depositing of the solder.

While the preferable method of forcing the material into the aperture is by use of mechanical means by reason of the rapidity with which the act may be performed, it is to be understood that the material may be replaced or forced into the aperture and soldered in position by hand without departing from the spirit of this invention.

A can of the form shown involves no greater manufacturing cost than a can of the ordinary form and the cost of sealing the can by the method herein disclosed is considerably less as it is evident that not only is the labor cost materially lessened but practically all cans may be properly sealed in the soldering operation and the labor of inspection and of resoldering imperfectly sealed cans is reduced to a minimum. A saving of material is also effected by reason of no separate cap being required for the larger openings and only a small amount of solder is necessary to properly seal the opening.

Having thus briefly described my improved method of sealing metal cans and the preferable means by which it may be performed, what I claim and desire to secure by Letters Patent of the United States is—

1. The method of sealing metal cans provided with a filling aperture, consisting in replacing the material displaced in forming the aperture, forcing the replaced material below the surface of the surrounding metal to form a shallow pocket, and filling the pocket with solder.

2. The method of sealing cans provided with a filling aperture formed by displacing the material to project exteriorly of the can consisting in forcing the displaced material into the opening to form a shallow pocket and depositing solder therein.

3. A method of sealing metal cans provided with a filling aperture formed by displacing the material to project exteriorly of the can in the shape of prongs, consisting in forcing the prongs into the opening slightly below their original position and depositing solder thereon.

4. The method of sealing metal cans provided with a filling aperture formed by displacing the material to project exteriorly of the can in the shape of prongs, consisting in forcing the prongs into the opening to form a shallow pocket and filling the pocket with solder.

5. The method of sealing metal cans provided with a filling aperture formed by a displacement of the material consisting in replacing the displaced material, forcing the replaced material below the surface of the surrounding material to form a shallow pocket and depositing solder therein.

6. The method of sealing metal cans provided with a filling aperture formed by a displacement of the material to project exteriorly of the can, consisting in replacing said material in the aperture, depressing the material to form a shallow pocket and soldering the material in its depressed position.

7. The method of sealing metal cans provided with a filling aperture formed by displacement of the material to project exteriorly of the can consisting in forcing the displaced material into the opening to form a shallow pocket and simultaneously depositing solder therein.

8. The method of sealing metal cans provided with a filling aperture formed by displacing the material to project exteriorly of the can in the shape of prongs consisting in forcing the prongs into the opening slightly below their original position and closing the interstices therebetween by means of a solder.

9. The method of sealing metal cans provided with a filling aperture formed by displacement of the material consisting in forcing the displaced material into the opening to form a shallow pocket and depositing a sealing medium therein.

10. The method of sealing metal cans provided with a filling aperture formed by displacement of the material consisting in partially closing the aperture with the displaced material in a manner to form a shallow pocket, and completing the closing of the aperture by the use of a sealing medium.

In testimony whereof, I sign this specification in the presence of two witnesses.

CHARLES E. ROGERS.

Witnesses:
CHARLES E. WISNER,
SELENE McDONALD.